Figure 1:
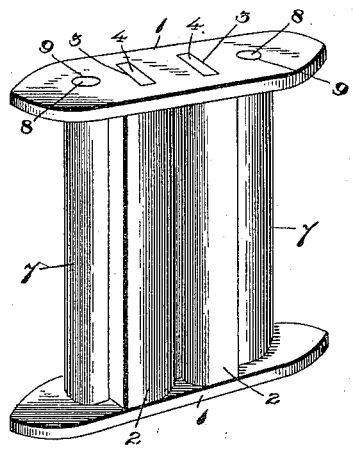

(No Model.) 2 Sheets—Sheet 1.

W. P. CARLEY & W. T. RICKARDS.
BELT CLAMP.

No. 606,512. Patented June 28, 1898.

WITNESSES
T. L. Mockabee
H. H. Byrne.

INVENTORS
William P. Carley
William T. Rickards
by John Wedderburn
Attorney (No Model.) 2 Sheets—Sheet 2.
W. P. CARLEY & W. T. RICKARDS.
BELT CLAMP.
No. 606,512. Patented June 28, 1898.
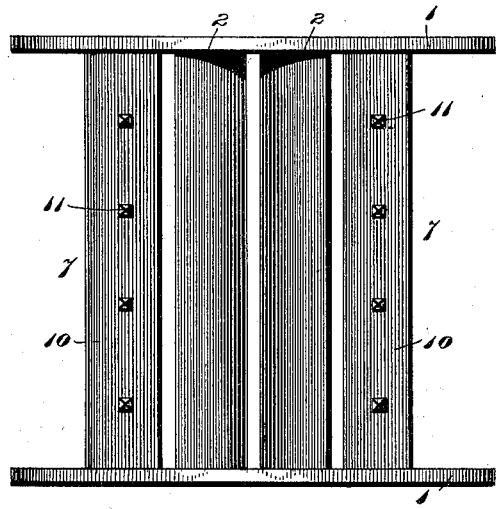
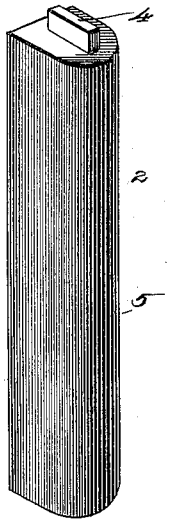
WITNESSES
T. L. Mockabu
Henry H. Byrne
INVENTORS
William P. Carley and
William T. Rickards,
by John Wedderburn
Attorney

UNITED STATES PATENT OFFICE.

WILLIAM P. CARLEY AND WILLIAM T. RICKARDS, OF CAMDEN, NEW JERSEY.

BELT-CLAMP.

SPECIFICATION forming part of Letters Patent No. 606,512, dated June 28, 1898.

Application filed November 25, 1896. Serial No. 613,385. (No model.)

*To all whom it may concern:*

Be it known that we, WILLIAM P. CARLEY and WILLIAM T. RICKARDS, citizens of the United States, residing at Camden, in the county of Camden and State of New Jersey, have invented certain new and useful Improvements in Belt-Clamps; and we do hereby declare the following to be a full, clear, and exact description of the invention, such as will enable others skilled in the art to which it appertains to make and use the same.

This invention relates to belt-clamps, and has for its object to provide a simple, cheap, and efficient coupling for connecting the contiguous ends of driving belts or bands, the said device enabling the ends of the belt to be quickly coupled and uncoupled and at the same time leaving the inner or working surface of the belt perfectly smooth and free from all obstructions.

The invention consists in an improved belt-clamp embodying certain novel features and details of construction, as hereinafter fully described, illustrated in the drawings, and incorporated in the claims.

Figure 2:
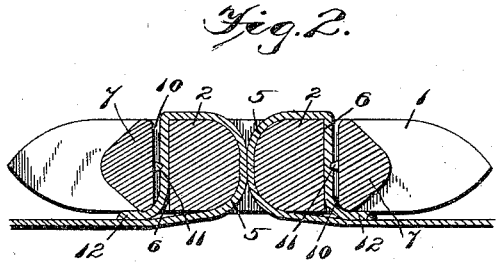
Figure 3:
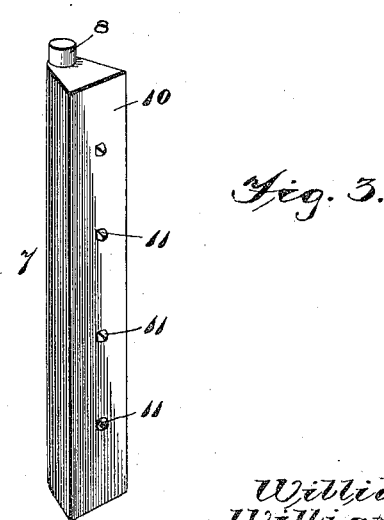

In the accompanying drawings, Figure 1 is a perspective view of the belt-clamp *per se.* Fig. 2 is an enlarged longitudinal section showing the two ends of the belt engaged in the clamp. Fig. 3 is a detail perspective view of one of the movable clamping-bars. Fig. 4 is a plan view of the belt-clamp. Fig. 5 is a detail perspective view of one of the cross-bars thereof.

Similar numerals designate corresponding parts in the several figures of the drawings.

The improved clamp contemplated in this invention is in the form of a skeleton frame, comprising spaced side bars 1 and connecting cross-bars 2, rigidly secured thereto. The side bars 1 are provided with spaced mortises 3, of irregular shape, preferably square or rectangular, and the cross-bars 2 have their ends reduced and made to correspond in cross-section to the shape of the openings 3, so that when these reduced ends or tenons (indicated at 4) are inserted in the side bars and secured the frame will be rigid throughout.

The cross-bars 2 are arranged parallel to each other and have their adjacent surfaces rounded, as indicated at 5, and also spaced apart sufficiently to permit the two ends of the belt to be inserted between them, as shown in Fig. 2. The outer or opposite surfaces of said cross-bars are approximately flat, as indicated at 6.

7 designates a pair of movable or rock bars which are journaled in the side bars 1. Each of the rock-bars 7 is approximately triangular in cross-section and is provided at its ends with oppositely-projecting and eccentrically-disposed trunnions 8, which are journaled in bearing-openings 9 in the side bars. Each bar 7 is provided with one approximately flat surface 10, from which project a series of pins or studs 11 of sufficient length to nearly or quite come in contact with the flat surface 6 of the rigid cross-bar 2 when the rock-bar is turned into the position indicated in Fig. 2. The ends of the belt or band (indicated at 12) are inserted between the cross-bars 2 from the under side and then carried in opposite directions over the cross-bars 2 and inserted between the outer surfaces of said cross-bars and the rock-bars 7. After the ends have been drawn so as to tighten the belt the rock-bars are partially rotated, so as to bring the teeth or spurs 11 into engagement with the ends of the belt, so as to indent the same and bind the belt firmly between the stationary and rock bars. When this is done, the greater the tension brought to bear on the belt the tighter will the bars 10 clamp the ends of the belt in place.

By means of the construction above described the ends of the belt may be quickly and easily coupled together and as readily uncoupled, and owing to the particular disposition of the several parts of the clamp nothing is left to project upon the inner or operative surface of the belt so as to interfere with the pulleys over which the belt runs or other parts of the mechanism.

The opposite ends of the side bars 2 are preferably rounded both as to their upper and lower edges, so as to prevent the same from catching in operative parts of the mechanism.

Having thus described the invention, what is claimed as new is—

1. A belt-clamp comprising in its construction spaced side bars, cross-bars connecting the same, and rock-bars arranged outside of said cross-bars and journaled in the side bars, each of the cross-bars being provided with a straight face forming biting edges, and each of the rock-bars also provided with a straight face adjacent to the straight face on the cross-bar, the construction and arrangement being such that the cross-bars are designed to have the ends of the belt passed entirely around them and the belt to extend between their flattened surfaces and those of the rock-bars, and the extreme ends of the belt to extend under the lower biting edges of the rock-bars, substantially as described.

2. A belt-clamp, comprising spaced side bars, cross-bars rigidly connecting the same, and rock-bars journaled in the side bars outside thereof and extending parallel to the cross-bars, said rock-bars being journaled eccentrically, substantially as described.

3. A belt-clamp comprising in its construction spaced side bars, cross-bars connecting the same, and rock-bars arranged outside of said cross-bars and journaled in the side bars and provided with spurs or teeth, each of the cross-bars being provided with a straight face forming biting edges, and each of the rock-bars also provided with a straight face adjacent to the straight face on the cross-bar, the construction and arrangement being such that the said cross-bars are designed to have the ends of the belt passed entirely around them and the belt to pass between their flattened surfaces and those of the rock-bars, and the extreme ends of the belt to extend under the lower biting edges of the rock-bars, substantially as described.

4. A belt-clamp, comprising side bars spaced apart, cross-bars rigidly connecting the same and having flat outer surfaces and rounded inner surfaces, and rock-bars journaled in the side bars and arranged parallel to the cross-bars and opposite the flattened surfaces thereof, said rock-bars being provided with a longitudinal series of teeth or spurs adapted to engage the ends of the belt between the cross-bars and rock-bars, substantially as described.

In testimony whereof we have signed this specification in the presence of two subscribing witnesses.

WILLIAM P. CARLEY.
WILLIAM T. RICKARDS.

Witnesses:
HARRY McCORN,
SELINA SEEMAN.